United States Patent
Li (10) Patent No.: US 10,234,873 B2
(45) Date of Patent: Mar. 19, 2019

(54) FLIGHT DEVICE, FLIGHT CONTROL SYSTEM AND METHOD

(71) Applicant: AUTEL ROBOTICS CO., LTD., Shenzhen, Guangdong (CN)

(72) Inventor: Zuoguang Li, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 50 days.

(21) Appl. No.: 15/625,225

(22) Filed: Jun. 16, 2017

(65) Prior Publication Data
US 2017/0308103 A1  Oct. 26, 2017

Related U.S. Application Data

(63) Continuation of application No. PCT/CN2016/071016, filed on Jan. 15, 2016.

(30) Foreign Application Priority Data

Nov. 13, 2015  (CN) .......................... 2015 1 0778779

(51) Int. Cl.
*G05D 1/00* (2006.01)
*G05D 1/10* (2006.01)
(Continued)

(52) U.S. Cl.
CPC ............. *G05D 1/101* (2013.01); *B64D 47/08* (2013.01); *G06T 7/00* (2013.01); *B64C 39/024* (2013.01); *B64C 2201/141* (2013.01)

(58) Field of Classification Search
None
See application file for complete search history.

(56) References Cited

U.S. PATENT DOCUMENTS 6,804,607 B1   10/2004  Wood
9,896,205 B1 *  2/2018  Gohl ..................... B64C 39/024
(Continued)

FOREIGN PATENT DOCUMENTS

CN   101554925 A   10/2009
CN   202075794 U   12/2011
(Continued)

OTHER PUBLICATIONS

International Search Report dated Jun. 12, 2016; PCT/CN2016/071016.

*Primary Examiner* — Jonathan M Dager
(74) *Attorney, Agent, or Firm* — Ladas & Parry LLP; Loren K. Thompson (57) ABSTRACT

A flight device includes a processor and a memory storing instructions which are executed by the processor causes the processor to: acquire an image; determine a scene; determine a height of the flight device; calculate an image first and second direction offsets of a second image frame relative to a first image frame of two adjacent image frames; acquire an acceleration and an angular velocity of the flight device in three dimensions; compensate for the image first and second direction offsets, according to the acceleration and the angular velocity, to obtain image correction offsets; calculate an first and second direction offsets in world coordinates corresponding to the image correction offsets; and derive a velocity of the flight device according to a time interval between time points at which the two adjacent image frames are captured and according to the first direction offset and the second direction offset.

20 Claims, 3 Drawing Sheets

(51) Int. Cl.
    *B64D 47/08*        (2006.01)
    *G06T 7/00*         (2017.01)
    *B64C 39/02*        (2006.01)

(56) References Cited

U.S. PATENT DOCUMENTS

| | | | |
|---|---|---|---|
| 10,049,589 B1 * | 8/2018 | Boyd | G05D 1/101 |
| 2008/0077284 A1 | 3/2008 | Swope | |
| 2011/0184593 A1 | 7/2011 | Swope | |
| 2014/0240464 A1 * | 8/2014 | Lee | G01S 17/08 |
| | | | 348/47 |
| 2014/0362176 A1 * | 12/2014 | St. Clair | H04N 5/23238 |
| | | | 348/36 |
| 2015/0071524 A1 * | 3/2015 | Lee | G06K 9/00208 |
| | | | 382/154 |
| 2016/0295108 A1 * | 10/2016 | Cao | H04N 5/23238 |
| 2017/0041553 A1 * | 2/2017 | Cao | G06T 5/50 |
| 2017/0123425 A1 * | 5/2017 | Zhao | G05D 1/102 |
| 2017/0293796 A1 * | 10/2017 | Li | B64C 39/024 |
| 2018/0003161 A1 * | 1/2018 | Michini | F03D 17/00 |
| 2018/0046187 A1 * | 2/2018 | Martirosyan | G05D 1/0094 |
| 2018/0109767 A1 * | 4/2018 | Li | H04N 5/23206 |
| 2018/0158197 A1 * | 6/2018 | Dasgupta | G05D 1/0094 |
| 2018/0204469 A1 * | 7/2018 | Moster | G05D 1/0094 |
| 2018/0246529 A1 * | 8/2018 | Hu | G05D 1/0202 |

FOREIGN PATENT DOCUMENTS

| | | |
|---|---|---|
| CN | 103941746 A | 7/2014 |
| CN | 104656664 A | 5/2015 |
| WO | 2007124014 A2 | 11/2007 |

\* cited by examiner

FLIGHT DEVICE, FLIGHT CONTROL SYSTEM AND METHOD

CROSS-REFERENCE

This application is a continuation application of International Application No. PCT/CN2016/071016, filed Jan. 5, 2016, which claims priority of Chinese Patent Application No. 201510778779.4, filed Nov. 13, 2015, which is incorporated herein by reference in its entirety.

TECHNICAL FIELD

The present disclosure relates to a method, and more particularly, relates to a flight control method and a flight control system for controlling a flight device, and relates to a flight device.

BACKGROUND

Currently, flight devices like Unmanned Aerial Vehicles (UAV), due to the convenience and security thereof, have been widely used in fields such as agricultural production, geological survey, meteorological monitoring, power line inspection, rescue and relief aid, video shooting, and map plotting and etc. In the control of the Unmanned Aerial Vehicle, the velocity detection and/or positioning control of the Unmanned Aerial Vehicle is a key technology. Currently, the velocity detection and/or the positioning control of the Unmanned Aerial Vehicle are mostly done via the positioning realized by the global positioning system (GPS). However, when the Unmanned Aerial Vehicle is located within a region where the GPS signal is relatively weak or a region without GPS signal coverage, the velocity detection and/or the positioning control of the Unmanned Aerial Vehicle are impossible. Moreover, currently the velocity detection and/or the positioning control of the Unmanned Aerial Vehicle are mostly performed by an algorithm based on a general scene. However, when the Unmanned Aerial Vehicle is actually located in a scene quite different from the general scene, the general scene-based-algorithm usually causes inaccurate positioning.

SUMMARY

An embodiment of the present disclosure provides a flight device. The flight device includes a processor and a memory. The memory stores instructions, wherein when execution of the instructions by the processor causes the processor to:

acquire an image captured by a binocular camera module of the flight device;

determine a scene in which the flight device is currently located;

determine a height of the flight device according to depth-of-field information of the image captured by the binocular camera module;

calculate an image first direction offset and an image second direction offset of a second image frame of two adjacent image frames relative to a first image frame of the two adjacent image frames, according to the two adjacent image frames captured by the binocular camera module and the scene in which the flight device is currently located;

acquire an acceleration and an angular velocity of the flight device in three dimensions that are detected by an acceleration sensor of the flight device; and compensating for the image first direction offset and the image second direction offset, according to the acceleration and the angular velocity of the flight device, so as to obtain image correction offsets comprising a corrected image first direction offset and a corrected image second direction offset; and calculate an first direction offset and a second direction offset in world coordinates corresponding to the image correction offsets according to a lens focal length of the binocular camera module, a height of the flight device and the image correction offsets; and deriving a velocity of the flight device according to a time interval between time points at which the two adjacent image frames are captured and according to the first direction offset and the second direction offset in world coordinates.

Another embodiment of the present disclosure provides a flight control method for controlling a flight device. The flight control method includes:

acquiring an image captured by a binocular camera module of the flight device;

determining a scene in which the flight device is currently located;

determining a height of the flight device according to depth-of-field information of the image captured by the binocular camera module;

calculating an image first direction offset and an image second direction offset of a second image frame of the two adjacent image frames relative to a first image frame of the two adjacent image frames, according to the two adjacent image frames captured by the binocular camera module and the scene in which the flight device is currently located;

acquiring an acceleration and an three dimensional angular velocity of the flight device in three dimensions that are detected by an acceleration sensor of the flight device; and compensating for the image first direction offset and the image second direction offset, according to the acceleration and the angular velocity of the flight device to obtain image correction offsets comprising a corrected image first direction offset and a corrected image second direction offset; and calculating a first direction offset and a second direction offset in world coordinates corresponding to the image correction offsets according to a lens focal length of the camera module, a height of the flight device and the image correction offsets; and deriving a velocity of the flight device according to a time interval between time points at which the two adjacent image frames are captured and according to the first direction offset and the second direction offset in world coordinates.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

REFERENCES

Flight device 100
Processor 10
Camera module 20
Acceleration sensor 30
Distance sensor 40
Flight control system S1
Acquisition module 11
Scene determination module 12
Height determination module 13
Image offset determination module 14
Offset calibration module 15
Velocity calculation module 16
Operation controlling module 17
Camera 21, 22
Lens 201
Image sensor 202
Image P1, P2
Object A
Imaging point A1
Lens focal length f
Height H
Corrected image X-offset x1
Corrected image Y-offset y1
X-offset in world coordinates X1
Y-offset in world coordinates Y1
Step 501-513

DETAILED DESCRIPTION

To make the objective, technical solutions and advantages of the present disclosure clearer, the present disclosure will be further detailed with reference to embodiments thereof and the attached drawings. It shall be appreciated that, the specific embodiments described herein are only used to explain the present disclosure rather than to limit the present disclosure.

Figure 1:
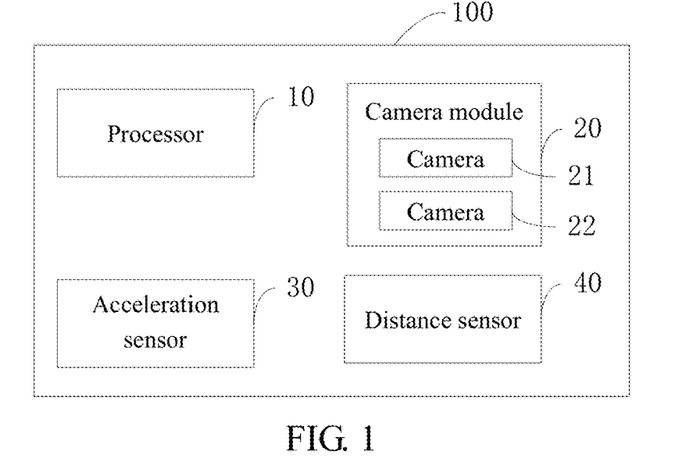
FIG. 1 is a schematic diagram of hardware architecture of a flight device according to an embodiment of the present disclosure.

Referring to FIG. 1, there is shown a schematic diagram of hardware architecture of a flight device 100 according to an embodiment of the present disclosure. The flight device 100 includes a processor 10, a camera module 20 and an acceleration sensor 30.

The camera module 20 is configured to capture an image at every preset time interval, e.g., an image is captured every two seconds. In this embodiment, the camera module 20 is a binocular camera module including two cameras 21 and 22. The camera module 20 acquires an image by each of the two cameras 21 and 22, respectively. The acceleration sensor 30 is configured to detect acceleration and angular velocity in three dimensions (X, Y, and Z) of the flight device 100. In an embodiment, the acceleration sensor 30 may be a gyroscope, and the distance sensor 40 may be an ultrasound sensor.

Figure 2:
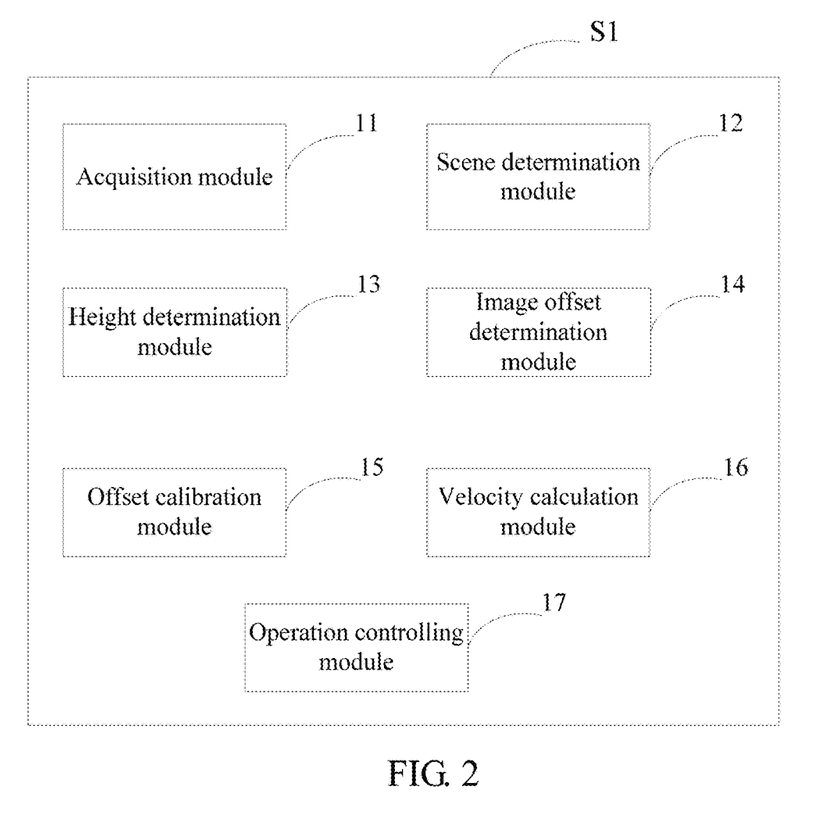
FIG. 2 is a module diagram illustrating a flight control system according to an embodiment of the present disclosure.

Also referring to FIG. 2, the processor 10 is running a flight control system S1. As shown in FIG. 2, the flight control system S1 includes an acquisition module 11, a scene determination module 12, a height determination module 13, an image offset determination module 14, an offset calibration module 15, a velocity calculation module 16 and an operation controlling module 17. The flight control system S1 is configured to detect the velocity of the flight device 100 and perform positioning control. Wherein, each module of the flight control system S1 may be a programmed instruction module, which could be called and executed by the processor 10. Each module of the flight control system S1 may also be the firmware embedded in the processor 10. In an application, the flight control system S1 may be an application software stored in a memory of the flight device 100.

The acquisition module 11 is configured to acquire the image(s) captured by the camera module 20. In this embodiment, the acquisition module 11 acquires the image captured by the camera module 20 in real time.

The scene determination module 12 is configured to determine a scene in which the flight device 100 is currently located. Specifically, the scene determination module 12 determines the scene in which the flight device 100 is located according to at least one parameter feature in the image.

The height determination module 13 is configured to calculate depth-of-field information acquired by the acquisition module 11, according to the images which are captured by the cameras 21 and 22 of the camera module 20; and to determine the height of the flight device 100 according to the depth-of-field information.

The image offset determination module 14 is configured to calculate an image X-offset (first direction offset) and an image Y-offset (second direction offset) of a second image frame of the two adjacent image frames relative to a first image frame of the two adjacent image frames, according to two adjacent image frames captured by the camera module 20 which is acquired by the acquisition module 11 and the scene in which the flight device 100 is currently located as determined by the scene determination module 12. Wherein, what acquired by the image offset determination module 14 are two adjacent image frames that are captured in sequence by any one of the first and second cameras 21, 22 in the camera module 20. In an embodiment, the image offset determination module 14 analyzes changes in the parameters of the two image frames according to the algorithm corresponding to the scene in which the flight device 100 is located, so as to calculate the image X-offset and the image Y-offset of the second image frame of the two adjacent image frames relative to the first image frame of the two adjacent image frames. In another embodiment, the image offset determination module 14 can determine a same feature point in the two adjacent image frames, and calculate a X-offset and a Y-offset of the same feature point in the two adjacent image frames, so as to obtain the image X-offset and the image Y-offset. Wherein, the same feature point is the imaging point of a same object in the two adjacent image frames, and the image X-offset and the image Y-offset are the offsets of the same object in the X direction (first direction) and in the Y direction (second direction) of the imaging point in the two image frames.

The offset calibration module 15 is configured to acquire an acceleration and an angular velocity of the flight device 100 in three dimensions that are detected by the acceleration sensor 30, and compensate for the image X-offset and the image Y-offset according to the acceleration and the angular velocity of the flight device 100 so as to obtain image correction offsets.

The velocity calculation module 16 is configured to calculate, according to a lens focal length, a height of the flight device 100 and the image correction offsets, an X-offset and a Y-offset in world coordinates corresponding to the image correction offsets, i.e., the actual X-offset and the actual Y-offset corresponding to the real world. Wherein, the X and Y in the present disclosure respectively refer to the lateral-axis direction and the longitudinal-axis direction in the plane parallel to the ground in the three-dimensional coordinate system. The X-offset and the Y-offset in world coordinates refer to the moving distances of the flight device 100/camera module 20 in the X direction and the Y direction relative to the ground.

Figure 3:
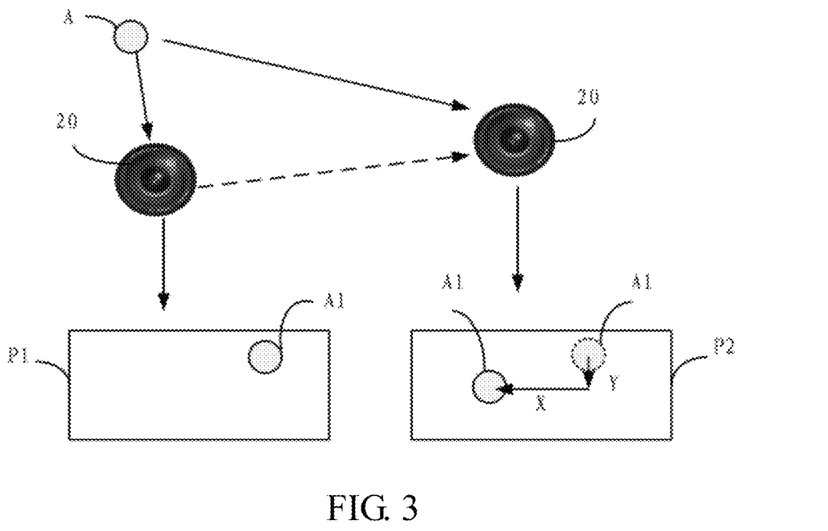
FIG. 3 is a schematic diagram illustrating an X-offset and a Y-offset in world coordinates according to an embodiment of the present disclosure.

Also referring to FIG. 3, there is shown a schematic diagram illustrating the X-offset and the Y-offset in world coordinates. Wherein, since the flight device 100 could move during the time interval between time points at which two adjacent image frames P1 and P2 are captured, for an actual object A, the camera module 20 of the flight device 100 would move relative to this actual object A when the camera module 20 is capturing the images. As shown in FIG. 3, each of the cameras 21 and 22 of the camera module 20 includes a lens 201 and an image sensor 202. When the flight device 100 moves a certain distance towards the upper right direction during the time interval between time points at which the two adjacent image frames P1 and P2 are captured, the actual object A is imaged on the image sensor 202 via the lens 201 of the flight device 100. An imaging point A1 of the actual object A in the two adjacent image frames P1 and P2 would offset towards the lower left direction as shown in FIG. 3, and thus an image X-offset and an image Y-offset are formed. Image correction offsets are obtained by compensating and correcting the image X-offset and the image Y-offset. Therefore, there are certain corresponding relationships between the image correction offsets and the X-offset and the Y-offset in world coordinates, and the X-offset and the Y-offset in world coordinates can be obtained according to the image correction offsets or the like. Wherein the camera module 20 may be a camera, a video camera, a webcam or the like. The image correction offsets are the actual distances of the imaging point A1 of the object A in the two adjacent image frames P1 and P2 in the X direction and the Y direction of the image sensor 202.

Figure 4:
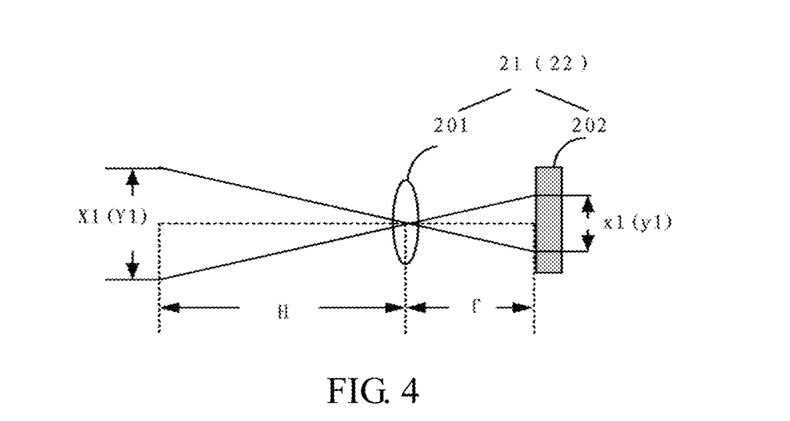
FIG. 4 is a schematic diagram illustrating relationships between the X-offset and the Y-offset in world coordinates and the image correction offsets according to an embodiment of the present disclosure.

Also referring to FIG. 4, there is shown a schematic diagram illustrating relationships between the X-offset and the Y-offset in world coordinates and the image correction offsets. Let the lens focal length be f, the height of the flight device 100 be H, the corrected image X-offset in the image correction offsets be x1, the corrected image Y-offset in the image correction offsets be y1, the X-offset in world coordinates be X1, and the Y-offset in world coordinates be Y1. Obviously, when the camera module 20 is shooting an image downward, the object distance is exactly the height H. As shown in FIG. 4, the ratio of the X-offset or the Y-offset in world coordinates to the corrected image X-offset or the corrected image Y-offset equals to the ratio of the lens focal length f to the height H. That is, the relationships between the X-offset, Y-offset in world coordinates and the image correction offsets satisfy Formula 1: x1/X1=f/H and Formula 2: y1/Y1=f/H. Since the focal length f, the height H, the corrected X-offset x1 and the corrected Y-offset y1 in the image correction offsets are all known, the velocity calculation module 16 can calculate the X-offset in world coordinates X1 and the Y-offset in world coordinates Y1 from the lens focal length, the height of the flight device 100 and the image correction offsets according to the aforesaid Formula 1 and Formula 2, respectively.

The velocity calculation module 16 derives a velocity of the flight device 100, according to a time interval t1 between time points at which the two adjacent image frames are captured and the X-offset and the Y-offset in world coordinates. As described above, the X-offset and the Y-offset in coordinates are the moving distances in the X direction and the Y direction of the flight device 100 during the time interval between time points at which the two adjacent image frames are captured. Let the time interval between the time points at which the two adjacent image frames are captured by the camera module 20 be t1. The velocity calculation module 16 calculates the rate of the flight device 100 in the X direction as X1/t1 and the rate of the flight device 100 in the Y direction as Y1/t1, according to the time interval t1 and the X-offset and the Y-offset in world coordinates. In an embodiment, the velocity calculation module 16 derives the vector sum of the X-offset and the Y-offset in world coordinates to obtain the actual shift D1 of the flight device 100, and then calculates that the actual velocity of the flight device 100 as D1/t1.

The operation controlling module 17 is configured to perform positioning and/or hovering control on the flight device 100 at least based on the velocity of the flight device 100. For example, the operation controlling module 17 calculates the time required according to the velocity of the flight device 100 and the distance between the flight device 100 and the destination, and makes preparations for the hover or landing when the time required is smaller than a preset value. In an embodiment, if the operation controlling module 17 determines that the currently worked out velocity and the velocity worked out last time are equal in magnitude but opposite in directions, it determines that the flight velocity of the flight device 100 is nearly 0 and the moving distance is very small, e.g., 1 cm, and thus controls the flight device 100 to hover at a certain location.

Therefore, in the present disclosure, in absence of the GPS signals, through the captured image, the velocity of the flight device 100 can be calculated and positioning control can be performed.

The flight device 100 is an Unmanned Aerial Vehicle.

In some embodiments, the scene determination module 12 automatically determines the scene in which the flight device 100 is currently located according to the image captured by the camera module 20. In other embodiments, based on the scene selected by the user, the scene determination module 12 may also determine the scene selected by the user as the scene in which the flight device 100 is currently located.

As shown in FIG. 1, in an embodiment, the flight device 100 further includes a distance sensor 40 for detecting a distance from the flight device 100 to the ground, i.e., the height of the flight device 100. The height determination module 13 is configured to determine, according to the scene in which the flight device 100 is currently located, whether to derive the height of the flight device 100 according to the depth-of-field information calculated from the image captured by the camera module 20 or to acquire the distance detected by the distance sensor 40 as the height of the flight device 100.

Wherein, the scene determination module 12 determines the type of the scene according to at least one parameter feature in the image captured by the camera module 20.

Wherein, the at least one parameter includes texture. The scene determination module 12 processes the image by use of the Sobel gradient algorithm to obtain a gradient matrix, and counts the number C of pixels of which the gradient is greater than a threshold T1 in the gradient matrix. It is determined that the scene is relatively richly textured if the value C is greater than the threshold T2, and otherwise, it is determined that the scene is poorly textured.

The at least one parameter further includes reflections. The scene determination module 12 performs shadow statistics according to continuous multi-frame images to determine whether there are reflections so as to determine whether the scene is a scene with reflections or a scene without reflections. Specifically, when the scene determination module 12 determines that there are darker regions and brighter regions in the continuous multi-frame images, or when the scene determination module 12 performs Unmanned Aerial Vehicle light reflection detection to detect according to the shape of the Unmanned Aerial Vehicle light and determines that there is a region conforming with the shape of the Unmanned Aerial Vehicle light, it is determined that the scene is a scene with reflections. Specifically, the scene determination module 12 performs determination according to the reflection detection algorithm. Generally, for more reflective ground, since the circular light of the Unmanned Aerial Vehicle would present a grayscale image in the image which is somewhat bright, the scene determination module 12 determines whether each pixel of the grayscale image is larger than or equal to a threshold T, wherein the threshold T is set on the basis of experience and the threshold T can be set to 220. Moreover, the scene determination module 12 sets the pixel of which the gray value is larger than or equal to T to 255, and sets the pixel of which the gray value is smaller than T to 0, thereby converting the image into a binary image, wherein 0 is the background, and 255 is the foreground. Then extraction of connected regions is performed and the image is represented by an enclosing rectangle. The scene determination module 12 further performs target size determination, and determines the region within a target size range as a light reflection target. Wherein the target size range is obtained according to the measurements of the light reflections at different heights.

The at least one parameter further includes grayscale. The scene determination module 12 converts the image into a gray scale histogram according to the gray scale value of the image and performs statistics to compare the brightness of the image with the corresponding threshold, thereby determining whether the scene is dark, normal, or bright. Specifically, the scene determination module 12 sets a threshold T according to the average brightness L of the gray scale histogram, and determines that the scene is a dark scene if L<80 (candela), the scene is a bright scene if L>170, and the scene is a normal scene if 80<L<170.

The at least one parameter may further include lines. The scene determination module 12 performs gradient detection and binary processing on the image, and then determines whether there are straight lines by use of the conventional Hough straight-line detection. If it is determined that there is at least one straight line and the length of the straight line is at least ½ of the width of the image, the scene is determined as a richly-lined scene.

In an embodiment, the scene determination module 12 determines the type of the current scene based on one of the aforesaid parameters alone and the corresponding algorithm thereof. In other embodiments, the scene determination module 12 may also determine the scene based on several aforesaid parameters together and the corresponding algorithms thereof. For example, the scene determination module 12 may determine whether the current scene is a richly textured and lined scene based on both the texture and the line.

The height determination module 13 chooses to determine the height of the flight device 100 according to the depth-of-field information calculated from the image acquired by the cameras 21 and 22 of the camera module 20 or to acquire the distance detected by the distance sensor 40 as the height of the flight device 100 depending on whether the scene is a richly-textured scene and a maximum region area of a same texture. Specifically, the height determination module 13 choosing whether to determine the height of the flight device 100 according to the depth-of-field information calculated from the image acquired by the cameras 21 and 22 of the camera module 20 or to acquire the distance detected by the distance sensor 40 as the height of the flight device 100 according to the scene in which the flight device 100 is located includes the following steps.

In a richly-textured scene, if a maximum area AM of regions having similar depth values in the depth image is larger than SMIN and smaller than SMAX, the height determination module 13 chooses to determine the height of the flight device 100 according to the depth-of-field information calculated from the image captured by the cameras 21 and 22 of the camera module 20. Wherein the SMIN may be set to a quarter of the maximum area of the image (image width*image height), and the SMAX may be set to three quarters of the maximum area of the image.

In a richly-textured scene, if the maximum region area AM is larger than SMAX, and a height difference, between the height H corresponding to the region that is derived from the depth-of-field information of the image captured by the cameras 21 and 22 of the camera module 20 and a height measured by the distance sensor 40, exceeds a threshold (e.g., 10 cm), it is determined that the ultrasound detection for the scene is not very accurate and the height determination module 13 determine the height of the flight device 100 according to the depth-of-field information calculated from the image captured by the cameras 21 and 22 of the camera module 20.

Since an accurate result cannot be obtained for non-textured images, e.g., a poorly-textured floor tile, the depth information obtained is thus not accurate and the height measurement is also not accurate. However, relatively accurate height measurement can be obtained in the scene through ultrasound detection. Therefore, in a poorly-textured scene, the height determination module 13 adopts the height measured by the distance sensor 40.

In a richly-textured scene, if the maximum region area AM is smaller than SMIN or larger than SMAX (as described above, the SMIN is set to a quarter of the maximum area of the image (image width*image height), and the SMAX is set to three quarters of the maximum area of the image), the height determination module 13 adopts the height measured by the distance sensor 40.

The step of "the height determination module 13 calculating depth-of-field information of the image captured by the cameras 21 and 22 of the camera module 20 includes: calibrating the two cameras 21 and 22 in order to acquire the camera's internal parameters (focal length, image center, distortion coefficient, etc.) and external parameters R (rotation) matrix and T (translation) matrix. The specific steps are as follows: 1) calibrating the left camera 21 to acquire the internal and the external parameters; 2) calibrating the right camera 22 to acquire the external parameters; 3) calibrating the two cameras to acquire the translation and rotation relationships between the cameras). And then the height determination module 13 performs correction such as distortion correction on the two, performs stereo matching to obtain a parallax map, and finally performs three-dimensional (3D) reconstruction to obtain depth information, and performs graying on the depth map and normalizes the depth map to a range of [0, 255] to obtain the height H.

The image offset determination module 14 calculating, according to two adjacent image frames and the scene in which the flight device 100 is currently located, an image horizontal offset of a second image frame of the two adjacent image frames relative to a first image frame of the two adjacent image frames includes: the image offset determination module 14 analyzing changes in the parameters of the two image frames according to the algorithm corresponding to the scene in which the flight device 100 is located so as to calculate the image X-offset and the image Y-offset of the second image frame of the two adjacent image frames relative to the first image frame of the two adjacent image frames.

Specifically, for the richly-textured scene, the image offset determination module 14 adopts the algorithm of gray template matching. Specifically, let the width and the height of the current image be W and H respectively, the size of a template image T be Mx×My, wherein Mx=W−8, My=H−8, and the template image T is obtained from the location of the current image frame [4, 4]; the size of a matching image S is Nx×Ny, wherein Nx=W, Ny=H, and the matching image S is obtained from the previous frame image. During the matching, the template image is stacked on the matching image while being translated. The searched sub-image in the reference image covered by the template image is S(i, j), wherein i, j is the location of the upper-left corner image point of the sub-image in the matching image S, and values of i and j are within the range [−4, 4]. S (0, 0) corresponds to the location [4, 4] of A. During the matching, to find a searched sub-image as similar as possible to the template image and the coordinate locations i and j thereof, the correlation function SAD is calculated. The location where the SAD value of T and S(i, j) is minimum is the best matching location, i.e., the relative offset or movement in the X direction and the Y direction of two adjacent image frames, i.e., the image X-offset and the image Y-offset of the two adjacent image frames. Wherein the offset is within the range [−4, 4]. SAD refers to the process of calculating the sum of absolute values of the differences between pixels corresponding to each location of the two images. The smaller the SAD value is, the higher the level of matching of the two images will be, and the location where the SAD value is the minimum can be used as the best matching.

For the poorly-textured scene, the image offset determination module 14 adopts the Sobel gradient template matching algorithm. Specifically, the image offset determination module 14 performs edge detection through the Sobel operator which uses the two-dimensional template for calculation, wherein the two-dimensional template includes a horizontal template and a vertical template. As shown in the following figures, the horizontal template is used for difference operation in the horizontal direction, and the vertical template is used for difference operation in the vertical direction.

Horizontal template:

| −1 | 0 | 1 |
|---|---|---|
| −2 | 0 | 2 |
| −1 | 0 | 1 |

Vertical template:

| −1 | −2 | −1 |
|---|---|---|
| 0 | 0 | 0 |
| 1 | 2 | 1 |

The image offset determination module 14 uses the above templates to perform plane convolution operation so as to calculate the convolution fx in horizontal-direction and the convolution fy in vertical-direction respectively, and to calculate the gradient value G, which is the square root of the sum of squares of fx and fy. Thereafter, the gradient operation is performed on the two adjacent images respectively to obtain the gradient matrix A and the gradient matrix B. Wherein A refers to the Sobel gradient matrix of the previous frame image, and B refers to the Sobel gradient matrix of the current frame image. Let the size of the template image T be Mx×My, wherein Mx=W−8, My=H−8, and the template image T is obtained from the location [4, 4] of B; and let the size of the matching image S be Nx×Ny, wherein Nx=W, Ny=H, and the matching image S is obtained from A. During the matching, the template image is stacked on the matching image while being translated. The searched sub-image in the reference image covered by the template image is S(i, j), wherein i, j is the location of the upper-left corner image point of the sub-image in the matching image S, and values of i and j are within the range [−4, 4]. S (0, 0) corresponding to the location [4, 4] of A. Difference operation is performed on the gradient matrix T and S (i, j) to obtain a matrix difference matrix C. The sum of absolute values of each element in the matrix C that satisfies the following conditions (e.g., the following Condition 1 and Condition 2) is calculated to obtain the sum SS (i, j).

$$A[r,c]>T \quad \text{(Condition 1)}$$

$$B[r,c]>T \quad \text{(Condition 2)}$$

Wherein A[r, c] refers to the gradient value at the location r, c in the gradient matrix A, and B[r, c] refers to the gradient value at the location r, c in the gradient matrix B, wherein r>=0 and r<My, c>=0 and c<Mx, and T1 is gradient threshold. The location (i, j) where the value of SS(i, j) is minimum is the best matching location, i.e., relative offset or movement in the X direction and the Y direction of two adjacent image frames, i.e., the image X-offset and the image Y-offset of the two adjacent image frames. Wherein the offset is within the range [−4, 4].

When the scene in which the flight device 100 is currently located is an extremely bright scene or an extremely dark scene, the image offset determination module 14 performs histogram equalization on the image to make the brightness of the image uniform, and then determines whether the scene is a richly-textured scene and chooses the corresponding algorithm to process the image depending on whether the scene is a richly-texture scene according to the aforesaid relationships.

When the scene in which the flight device 100 is currently located is a scene with reflection, the image offset determination module 14 removes the shadow in the image. After the shadow is removed, the image offset determination module 14 determines whether the scene is a richly-textured scene, and chooses the corresponding algorithm depending on whether the scene is a richly-texture scene according to the aforesaid relationships.

When the scene in which the flight device 100 is currently located is a richly-lined scene, the image offset determination module 14 divides the straight lines into straight lines in the horizontal direction and straight lines in the vertical direction, and finds a straight line Lph from the previous frame image, wherein the angular difference between the straight line Lph and a straight line Lch in the horizontal direction detected in the current image is the smallest. The distance between the two straight lines is calculated as j, and j is set to 0 if it is not within the range [−R, R], wherein R is a preset moving range, and generally R is set to 4. A straight line Lpv is found from the previous frame image, the angular difference between which and a straight line Lcv in the vertical direction detected in the current image is the smallest. The distance between the two straight lines is calculated as i, and i is set to 0 if it is not within the range [−R, R]. i, j obtained through straight line positioning is the relative offset or movement of two adjacent images in the X direction and the Y direction, i.e., the image X-offset and the image Y-offset of the two adjacent image frames, and the offsets are within the range [−4, 4].

Accordingly, through the flight device 100 and the flight control system S of the present disclosure, the velocity detection and the positioning control can be performed on the flight device 100 when there is no GPS signal, and furthermore, accurate control can be achieved based on different scenes.

Figure 5:
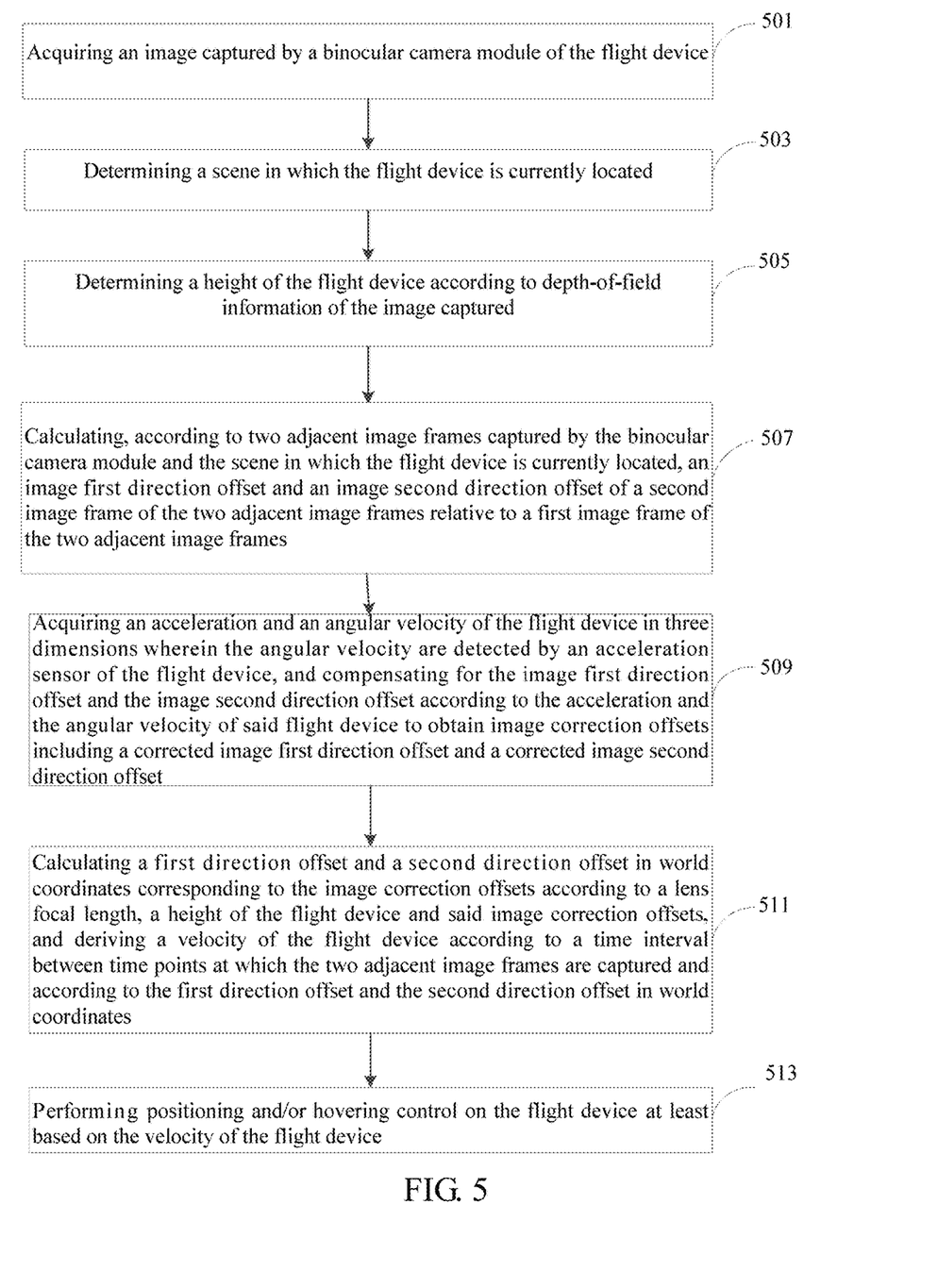
FIG. 5 is a flowchart diagram of a flight control method according to an embodiment of the present disclosure.

Referring to FIG. 5, there is shown a flowchart diagram of a flight control method according to an embodiment of the present disclosure. The flight control method is used to detect the velocity of the flight device 100 and perform positioning control on the flight device 100. The flight control method includes:

In block 501, the acquisition module 11 acquires the image captured by the camera module 20.

In block 503, the scene determination module 12 determines a scene in which the flight device 100 is currently located. The scene determination module 12 determines the type of the scene according to at least one parameter in the image captured by the camera module 20.

In block 505, the height determination module 13 determines a height of the flight device 100 according to depth-of-field information of the image captured by the binocular camera module 20.

In block 507, the image offset determination module 14 calculates, according to two adjacent image frames captured by the camera module 20 and the scene in which the flight device 100 is currently located, an image X-offset and an image Y-offset of a second image frame of the two adjacent image frames relative to a first image frame of the two adjacent image frames.

The image offset determination module 14 determines a same feature point in the two adjacent image frames, and calculates the X-offset and the Y-offset of the same feature point in the two adjacent image frames to obtain the image X-offset and the image Y-offset. The scene determination module 12 determines the type of the scene according to at least one parameter in the image captured by the camera module 20, chooses a corresponding algorithm according to the scene in which the flight device 100 is currently located, and analyzes and processes the two adjacent image frames according to the algorithm to obtain the image horizontal offset of the second image frame relative to the first image frame.

In block 509, the offset calibration module 15 acquires an acceleration and an angular velocity in three dimensions of the flight device 100 that are detected by the acceleration sensor 30, and compensates for the image X-offset and the image Y-offset according to the acceleration and the angular velocity of the flight device 100 to obtain image correction offsets.

In block 511, the velocity calculation module 16 calculates an X-offset and a Y-offset in world coordinates corresponding to the image correction offsets according to a lens focal length, a height of the flight device 100 and the image correction offsets, and derives a velocity of the flight device according to a time interval between time points at which the two adjacent image frames are captured and according to the X-offset and the Y-offset in world coordinates.

Specifically, the velocity calculation module 16 calculates a rate of the flight device in the X direction and a rate of the flight device in the Y direction according to the time interval t1 and according to the X-offset and the Y-offset in world coordinates. More specifically, the velocity calculation module 16 derives the rate of the flight device 100 in the X direction and the rate of the flight device 100 in the Y direction by respectively dividing the X-offset and the Y-offset by the time interval.

In block 513, the operation controlling module 17 performs positioning and/or hovering control on the flight device 100 at least based on the velocity of the flight device 100.

What described above are only the exemplary embodiments of the present disclosure, but are not intended to limit the scope of the present disclosure. Any modifications, equivalent replacements and improvements that are made within the spirit and the principle of the present disclosure shall all be covered within the scope of the present disclosure.

What is claimed is:
1. A flight device, comprising:
a processor; and
a memory communicably connected with the processor, the memory storing instructions, wherein when execution of the instructions by the processor causes the processor to:
acquire an image captured by a binocular camera module of the flight device;
determine a scene in which the flight device is currently located;
determine a height of the flight device according to depth-of-field information of the image captured by the binocular camera module;
calculate an image first direction offset and an image second direction offset of a second image frame of two adjacent image frames relative to a first image frame of the two adjacent image frames, according to the two adjacent image frames captured by the binocular camera module and the scene in which the flight device is currently located;
acquire an acceleration and an angular velocity of the flight device in three dimensions that are detected by an acceleration sensor of the flight device; and compensating for the image first direction offset and the image second direction offset, according to the acceleration and the angular velocity of the flight device, so as to obtain image correction offsets comprising a corrected image first direction offset and a corrected image second direction offset; and
calculate a first direction offset and a second direction offset in world coordinates corresponding to the image correction offsets according to a lens focal length of the binocular camera module, a height of the flight device and the image correction offsets; and deriving a velocity of the flight device according to a time interval between time points at which the two adjacent image frames are captured and according to the first direction offset and the second direction offset in world coordinates.

2. The flight device according to claim 1, wherein,
the determining a height of the flight device according to depth-of-field information of the image captured by the binocular camera module comprises:
calibrating two cameras of the binocular camera module to acquire internal parameters of the camera module comprising focal length, image center and distortion coefficients, and external parameters of the camera module comprising rotation matrix and translation matrix of the camera module;
correcting the two cameras;
performing stereo matching to obtain a parallax map; and
performing three-dimensional reconstruction to obtain depth information, and
normalizing the depth information to a range of [0, 255] to obtain a depth map.

3. The flight device according to claim 1, wherein the flight device further comprises a distance sensor for detecting a distance from the flight device to the ground, and
execution of the instructions by the processor further causes the processor to:
determine, according to the scene in which the flight device is currently located, whether to derive the height of the flight device according to the depth-of-field information of the image captured by the camera module or to acquire the distance detected by the distance sensor as the height of the flight device.

4. The flight device according to claim 3, wherein execution of the instructions by the processor further causes the processor to: determine whether the scene in which the flight device is located is a richly-textured scene or a poorly-textured scene according to at least one parameter in the image captured by the camera module, and the at least one parameter comprises texture.

5. The flight device according to claim 4, wherein execution of the instructions by the processor further causes the processor to: choose whether to determine the height of the flight device according to the depth-of-field information of the image acquired by the camera module or to acquire the distance detected by the distance sensor as the height of the flight device, depending on whether the scene is the richly-textured scene and on a maximum region area (AM) of the same textures.

6. The flight device according to claim 5, wherein in the richly-textured scene, if it is determined that the maximum region area (AM) having a similar depth value in a depth image is larger than a minimum value (SMIN) and smaller than a maximum value (SMAX), execution of the instructions by the processor further causes the processor to: choose to determine the height of the flight device according to the depth-of-field information of the image captured by the cameras of the camera module, wherein the minimum value (SMIN) is a quarter of the maximum area of the image and the maximum value (SMAX) is three quarters of the maximum area of the image.

7. The flight device according to claim 5, wherein in the richly-textured scene, if it is determined that the maximum region area (AM) having a similar depth value in a depth image is larger than a maximum value (SMAX) and a difference between the height corresponding to the region that is derived from the depth-of-field information of the image captured by the camera module and the height measured by the distance sensor exceeds a threshold, execution of the instructions by the processor further causes the processor to: choose to determine the height of the flight device according to the depth-of-field information calculated from the image captured by the camera module, wherein the maximum value (SMAX) is three quarters of the maximum area of the image.

8. The flight device according to claim 5, wherein in the richly-textured scene, if it is determined that the maximum region area (AM) having a similar depth value in a depth image is smaller than a minimum value (SMIN) or larger than a maximum value (SMAX), execution of the instructions by the processor further causes the processor to: choose to adopt the distance measured by the distance sensor as the height of the flight device; the minimum value (SMIN) is a quarter of the maximum area of the image and the maximum value (SMAX) is three quarters of the maximum of the image.

9. The flight device according to claim 5, wherein execution of the instructions by the processor further causes the processor to: in a poorly-textured scene, adopt the distance measured by the distance sensor as the height of the flight device.

10. The flight device according to claim 1, wherein execution of the instructions by the processor further causes the processor to: calculate the first direction offset in world coordinates according to Formula 1: $x1/X1=f/H$, and calculates the second direction offset in world coordinates according to Formula 2: $y1/Y1=f/H$, x1 is a corrected image first direction offset, y1 is a corrected image second direction offset, f is lens focal length, H is height of the flight device, X1 is the first direction offset in world coordinates, and Y1 is the second direction offset in world coordinates; and calculate a rate of the flight device in the first direction and a rate of the flight device in the second direction, according to the time interval between time points at which the two adjacent image frames are captured by the camera module, and according to the first direction offset and the second direction offset in world coordinates.

11. A flight control method for controlling a flight device, comprising:
acquiring an image captured by a binocular camera module of the flight device;
determining a scene in which the flight device is currently located;
determining a height of the flight device according to depth-of-field information of the image captured by the binocular camera module;
calculating, according to two adjacent image frames captured by the binocular camera module and the scene in which the flight device is currently located, an image first direction offset and an image second direction offset of a second image frame of the two adjacent image frames relative to a first image frame of the two adjacent image frames;
acquiring an acceleration and an three dimensional angular velocity of the flight device in three dimensions that are detected by an acceleration sensor of the flight device; and compensating for the image first direction offset and the image second direction offset, according to the acceleration and the angular velocity of the flight device to obtain image correction offsets comprising a corrected image first direction offset and a corrected image second direction offset; and
calculating a first direction offset and a second direction offset in world coordinates corresponding to the image correction offsets according to a lens focal length of the camera module, a height of the flight device and the image correction offsets; and deriving a velocity of the flight device according to a time interval between time points at which the two adjacent image frames are captured and according to the first direction offset and the second direction offset in world coordinates.

12. The flight control method according to claim 11, wherein the determining a height of the flight device according to depth-of-field information of the image captured by the binocular camera module comprises:
measuring two cameras of the binocular camera module to acquire internal parameters comprising focal length, image center and distortion coefficients and external parameters comprising rotation matrix and translation matrix of the camera module;
correcting the two cameras;
performing stereo matching to obtain a parallax map; and
performing three-dimensional reconstruction to obtain depth information, and
normalizing the depth information to a range of [0, 255] to obtain a depth map.

13. The flight control method according to claim 11, wherein the method further comprises:
determining, according to the scene in which the flight device is currently located, whether to derive the height of the flight device according to the depth-of-field information of the image captured by the camera module or to acquire the distance detected by the distance sensor as the height of the flight device.

14. The flight control method according to claim 13, wherein the determining a scene in which the flight device is currently located comprises:
determining whether the scene in which the flight device is located is a richly-textured scene or a poorly-textured scene according to at least one parameter in the image captured by the camera module, wherein the at least one parameter comprises texture.

15. The flight control method according to claim 14, wherein the determining, according to the scene in which the flight device is currently located, whether to derive the height of the flight device according to the depth-of-field information of the image captured by the camera module or to acquire the distance detected by the distance sensor as the height of the flight device comprises:
in a richly-textured scene, if a maximum region area (AM) having a similar depth value in the depth image is larger than a minimum value (SMIN) and smaller than a maximum value (SMAX), choosing to determine the height of the flight device according to the depth-of-field information of the image captured by the cameras of the camera module, wherein the minimum value (SMIN) is a quarter of the maximum area of the image and the maximum value (SMAX) is three quarters of the maximum area of the image.

16. The flight control method according to claim 14, wherein the determining, according to the scene in which the flight device is currently located, whether to derive the height of the flight device according to the depth-of-field information of the image captured by the camera module or to acquire the distance detected by the distance sensor as the height of the flight device comprises:
in a richly-textured scene, if a maximum region area (AM) having a similar depth value in the depth image is larger than a maximum value (SMAX), and a difference between the height corresponding to the region that is derived from the depth-of-field information of the image captured by the camera module and the height measured by the distance sensor exceeds a threshold, choosing to determine the height of the flight device according to the depth-of-field information calculated from the image captured by the camera module, wherein the maximum value (SMAX) is three quarters of the maximum area of the image.

17. The flight control method according to claim 14, wherein the determining, according to the scene in which the flight device is currently located, whether to derive the height of the flight device according to the depth-of-field information of the image captured by the camera module or to acquire the distance detected by the distance sensor as the height of the flight device comprises:
in a richly-textured scene, if a maximum region area (AM) having a similar depth value in the depth image is smaller than a minimum value (SMIN) or larger than a maximum value (SMAX), choosing to adopt the distance measured by the distance sensor as the height of the flight device, wherein the minimum value (SMIN) is a quarter of the maximum area of the image and the maximum value (SMAX) is three quarters of the maximum area of the image.

18. The flight control method according to claim 14, wherein the determining, according to the scene in which the flight device is currently located, whether to derive the height of the flight device according to the depth-of-field information of the image captured by the camera module or to acquire the distance detected by the distance sensor as the height of the flight device comprises:
in a poorly-textured scene, adopting the distance measured by the distance sensor as the height of the flight device.

19. The flight control method according to claim 11, wherein the calculating a first direction offset and a second direction offset in world coordinates corresponding to the image correction offsets according to a lens focal length of the binocular camera module, a height of the flight device and the image correction offsets comprises:
calculating the first direction offset in world coordinates according to Formula: $x1/X1=f/H$; and
calculating the second direction offset in world coordinates according to Formula: $y1/Y1=f/H$, wherein x1 is the corrected image first direction offset, y1 is the corrected image second direction offset, f is the lens focal length, H is the height of the flight device, X1 is the first direction offset in world coordinates, and Y1 is the second direction offset in world coordinates.

20. A non-volatile computer storage medium storing computer executable instructions, wherein when the computer executable instructions are executed by a processor, causes the processor to perform the flight control method of claim 11.

* * * * *